United States Patent [19]

Johnson et al.

[11] 3,845,937

[45] Nov. 5, 1974

[54] HELICOPTER CARGO LIFTING SYSTEM

[75] Inventors: Walker P. Johnson; Charles C. Cotton; David R. Bon; Trules L. Peterson, all of Panama City, Fla.

[73] Assignee: The United States of America as represented by the Secretary of the Navy, Washington, D.C.

[22] Filed: Dec. 14, 1973

[21] Appl. No.: 425,059

[52] U.S. Cl. .................................................. 258/1.8
[51] Int. Cl. .............................................. B64d 1/00
[58] Field of Search ............... 258/12, 1.6, 1.8, 1.2; 244/137

[56] References Cited
UNITED STATES PATENTS
3,601,342  8/1971  Piasecki ..................... 244/137 R Primary Examiner—Robert B. Reeves
Assistant Examiner—Hadd Lane
Attorney, Agent, or Firm—Richard S. Sciascia; Don D. Doty; Harvey A. David

[57] ABSTRACT

A helicopter cargo lifting system is described wherein a cable and ball are guided into a socket on the end of a boom in a lowered, rest position. The boom is adapted to be raised to a vertical, cargo carrying position. Upon landing of the cargo, a spring and air check mechanism, cause the boom to be lowered rapidly to an intermediate position and then slowly to the rest position. The socket is automatically positioned to facilitate cable and ball withdrawal during the slow lowering movement of the boom.

15 Claims, 3 Drawing Figures

HELICOPTER CARGO LIFTING SYSTEM

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION

This invention relates generally to the field of cargo handling and more particularly to the art of hoist lines and implements for use in attachment to, and lifting of objects from a ground, water, shipboard, or other surface, for example, by an airborne helicopter.

Various operations, both military and non-military require a load to be lifted from the ground, or other surface, by an airborne helicopter. These operations include those situations where attachment of a cable, depending from a helicopter, is desirably performed quickly and without exposing surface personnel to various hazards including those of manually coupling the cable to the load to be lifted. Moreover, in situations where the load is on or close to the surface of water, it is desirable that the helicopter can attach its cable, without assistance, while hovering at sufficient altitude to avoid ingestion of water spray by its engines. An example of such a situation is when a helicopter is required to attach to minesweeping apparatus for lifting and/or towing by the helicopter. Of course, it is similarly desirable for the helicopter to be able to disengage its cable from the load without manual assistance, and while at a good working altitude.

DISCUSSION OF THE PRIOR ART

Various devices have been proposed for attaching an aircraft deployed cable to a load to be hoisted, including some for use specifically by helicopters. One example is found in U.S. Pat. No. 3,677,507 to G. A. Kendall et al. That patent describes a very complex cable hook that is carried attached to the nose of a helicopter so that the pilot can maneuver the helicopter to bring the hook into engagement with a bail provided on the load to be picked up. Also described is a folding cargo bail that presents a wide, horizontal bar target for the hook until lifting begins, and then displaces to form a bail that confines the hook to a location that is centered over the load.

While the patented device is of undoubted value for many situations, it requires the helicopter to operate, during attachment, at a lower altitude than is practical when picking up a load floating on the surface of water. Additionally, the complexity of the device makes it subject to more likelihood of malfunction than is desirable for operations, such as minesweeping, that do not require the load rotating or orienting abilities of the patented device.

BRIEF SUMMARY OF THE INVENTION

The present invention aims to overcome most or all of the disadvantages of the prior art with respect to attachment to and lifting loads, as well as attachment thereof, particularly when near or on the surface of water, through the agency of novel apparatus including a hitch element carrying boom that moves in a controlled manner between lowered and raised positions, and boom crutch means comprising guide means for leading a cable fitment into engagement with the boom hitch element.

With the foregoing in mind, it is a principal object of the invention to provide improved cable to load coupling apparatus.

Another object of the invention is the provision of apparatus that is simple in construction yet reliable in operation, and which permits coupling and uncoupling of a helicopter carried cable to a load while the helicopter remains at sufficient altitude to avoid ingestion of water spray when the load to be attached or detached is on or near the water surface.

Still another object is the provision of apparatus of the foregoing character that is automatic in operation to the extent that simple maneuvering by the helicopter pilot will suffice to connect or disconnect a load without assistance by surface personnel.

Yet another object is the provision, in load attachment apparatus, of novel constructions, combinations, and arrangements of parts, notably a pivoted boom and cooperating spring, air check, and lever means, by which the foregoing objects and advantages are achieved.

Other objects and many of the attendant advantages will be readily appreciated as the subject invention becomes better understood by reference to the following detailed description, when considered in conjunction with the accompanying drawings.

BRIEF DESCRIPTION OF THE DRAWINGS

FIG. 3 is a fragmentary sectional view, on an enlarged scale, of a part of the system of FIG. 1.

DESCRIPTION OF THE PREFERRED EMBODIMENT

Figure 1:
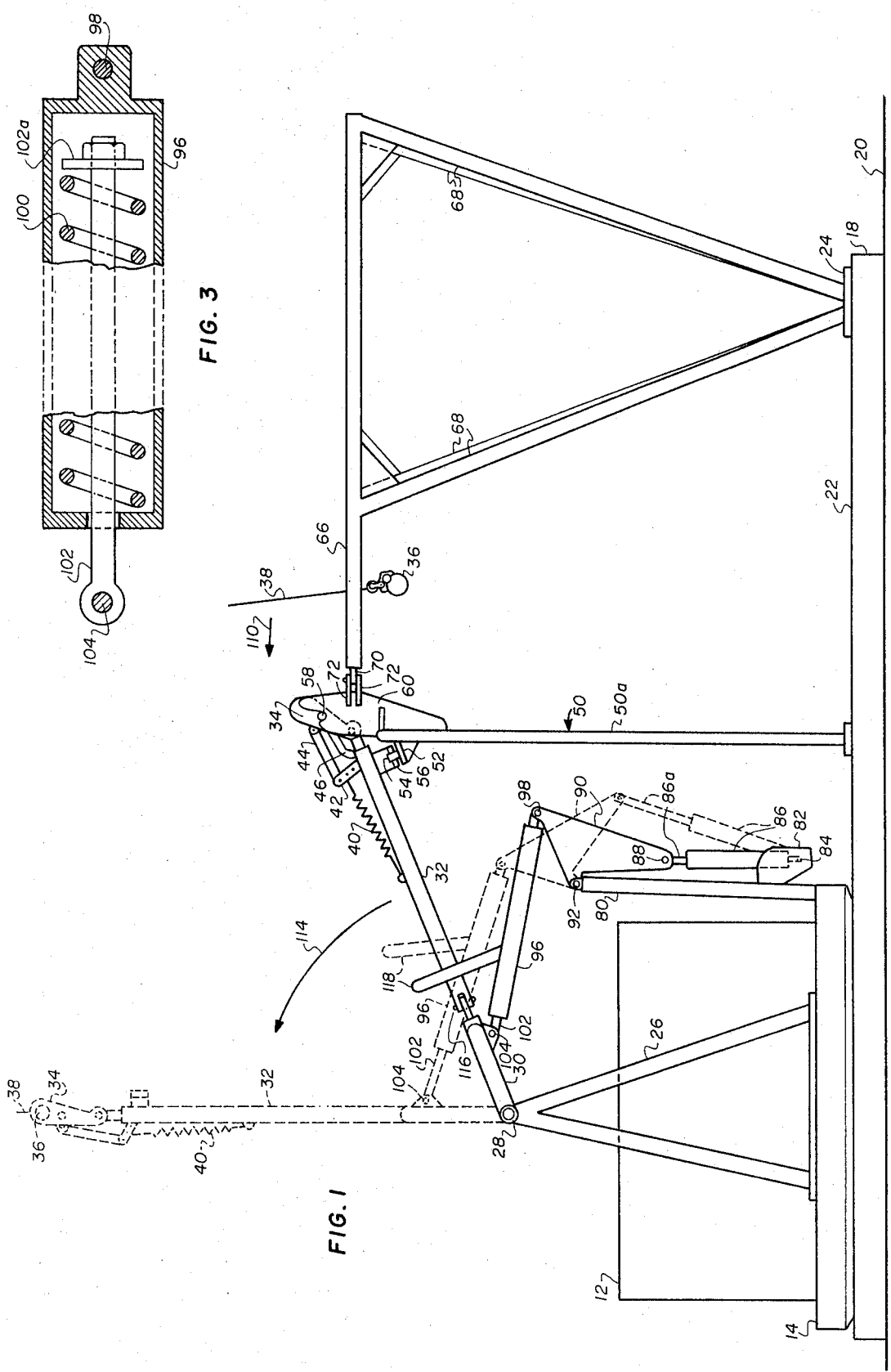
FIG. 1 is a side elevational view of a helicopter cargo lifting system embodying the present invention, with different positions of some components shown in phantom.

In the form of the invention illustrated in the drawings and described hereinafter, there is provided a helicopter cargo lifting system, generally indicated at 10 in FIG. 1, that is particularly useful in situations wherein it is not safe or desireable for personnel to manually couple a cable to the cargo or object to be lifted, and wherein it is undesireable for the lifting helicopter to be operated too close to the object supporting surface. As an example, system 10 will be described with reference to lifting of an object or load 12 carried by a load supporting frame including a pallet 14. Pallet 14, in this example, rests upon pontoon structure, generally indicated at 18, that is floating on a body of water 20.

Pontoon structure 18 comprises a pair of elongate floats 22 held in laterally spaced, parallel relation by cross members such as member 24. In this example, load supporting pallet 14 conveniently spans the floats 22 adjacent one end thereof.

Pallet 14 is provided at opposite sides thereof with upwardly and inwardly extending brackets 26, each conveniently formed of tubular steel in inverted-V configuration. Brackets 26 are securely fastened to pallet 14 so as to be able to support the pallet and load 12 thereon.

The vertices of brackets 26 are provided with coaxially aligned bearings 28 that receive trunions of a boom truss 30 that is thereby adapted to pivot about a horizontal axis through bearings 28. Extending from boom truss 30, for pivotal movement therewith, is a boom 32 that carries at its outer end a coupling device in the form of a ball hitch socket 34. Boom 32 and socket 34 are movable from their full line positions, illustrated in FIG. 1, to vertical positions as shown in dot and dash lines in that Figure.

Socket 34, which is adapted to receive a cable coupling fitment in the form of a ball 36 on a hoist cable 38, is connected to the end of boom 32 so as to permit limited pivotal movement, in a vertical plane, with respect to boom 32. Movement of socket 34 in a direction out of alignment with the longitudinal axis of boom 32 is effected by a tension spring 40 connected at one end to boom 32 and at its other end to a stand off lever 42 having its inner end pivoted to boom 32. Lever 42 is connected at its outer end by a link 44 to socket 34. Movement of socket 34 under the influence of spring 40 is limited by a stop member 46.

Boom 32 and its associated socket 34 are adapted to be supported in a resting position, as shown in full lines in FIG. 1, by a broom crutch means comprising a support gallows. Gallows 50 is conveniently formed of tubular steel and includes upwardly and inwardly extending portions 50a rising from pontoon floats 22, and a horizontal portion 50b. A bracket 52 extends from horizontal portion 50b and serves to support a negator spring 54 engageable by a plunger 56 extending downwardly from boom 32.

A pair of generally parallel, laterally spaced, vertically extending guide plates 60 are fixed to gallows 50, as by welding, and are provided with notches in their upper portions in which are received ears or lugs 58 extending laterally from socket 34.

Attached to vertical guide plates 60 are a pair of converging, horizontal guide bars 66, each of which is supported by a plurality of angularly disposed legs 68, extending upwardly from a respective one of said floats 22. Guide bars 66 are each provided with an eye fitting 70 pinned between spaced flanges or guide pads 72 extending horizontally from a respective vertical guide plate 60. The vertical guide plates 60, converging guide bars 66, and horizontal guide pads 72 cooperate to guide the cable 38 and coupling ball 36 to bring the latter into the socket 34 in boom 32 during a coupling and lifting operation, further explanation of which will be given later in a discussion of the mode of operation of the invention.

Certain movements of boom 32 are controlled, in a manner which will presently be made apparent, by a combination of spring, air check, and lever means. To this end, a pair of upright stanchions 80 are provided on one end of load bearing pallet 14. A bracket 82 is fixed to the lower portions of stanchions 80 and serves as a support for pivotal connection 84 of one end of a cylinder 86 of a movement regarding means, conveniently in the form of a conventional air check device. A plunger 86a is reciprocable in cylinder 86, the plunger being substantially free of resistance to movement from its inner or full line position of FIG. 1 to its fully extended or dot and dash line position, to which position outward movement is limited. Movements of plunger 86a inwardly of cylinder 86, however, are slowed by the resistance of fluid, e.g., air being forced through a restriction by the plunger.

The outer end of plunger 86a is pivotally connected, as at 88, to one arm of a bell crank lever 90. Lever 90 is pivoted at 92 to suitable bracket means at the upper ends of stanchions 80. The other arm of lever 90 is connected to boom 32 through spring means comprising a cylinder 96, pivoted at 98 to lever 90. Cylinder 96 (see FIG. 3) contains a coil compression spring 100 that is confined between one end of the cylinder and the flanged end 102a of a pull rod 102 extending outwardly of the cylinder. Rod 102 is pivotally connected, as shown at 104, to boom 32. It will be recognized that the compression spring, cylinder, and pull rod combination just described functions in the nature of an extension spring when under tension, and as a solid link between boom 32 and lever 90 when under compression.

MODE OF OPERATION

Figure 2:
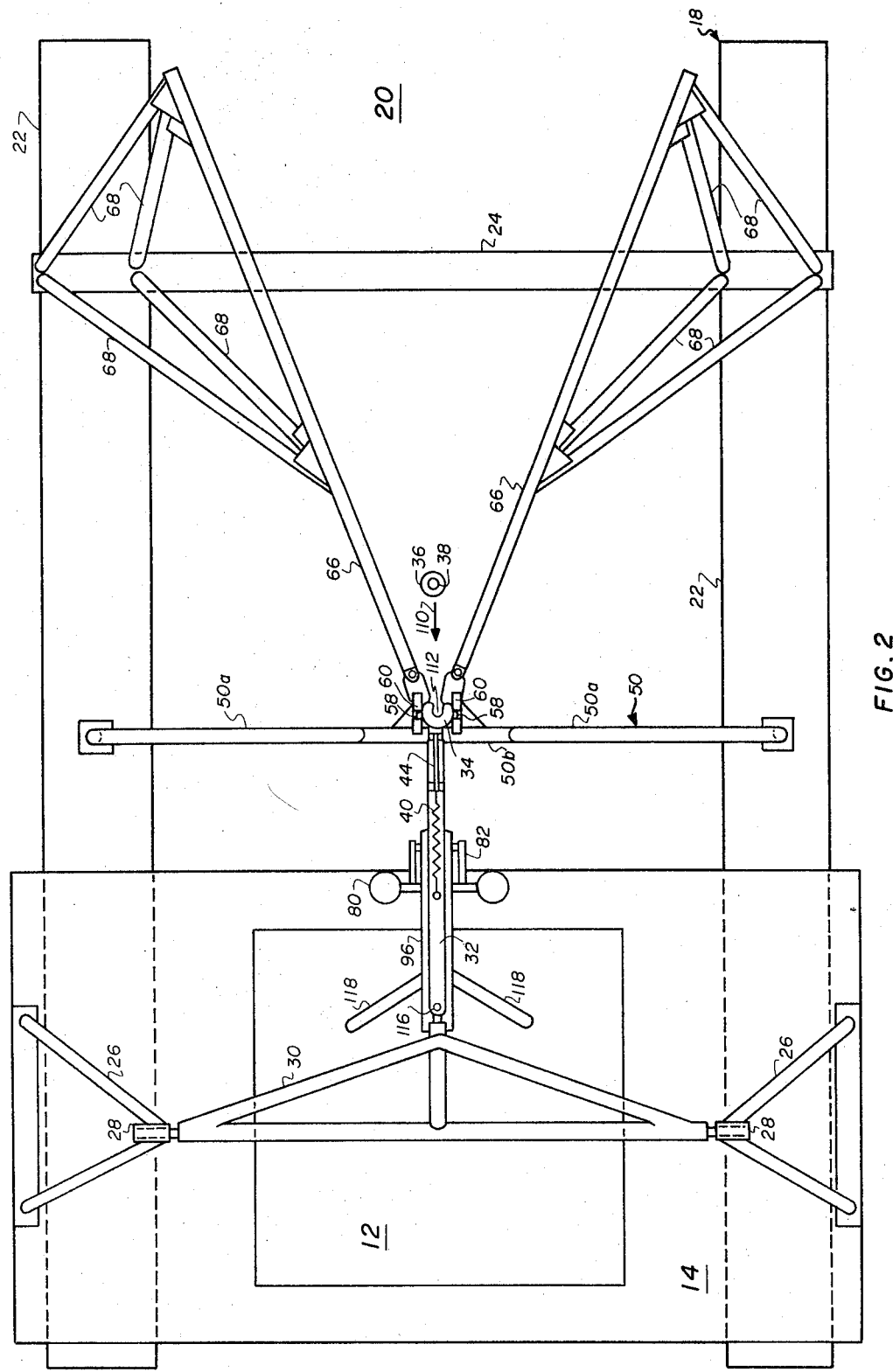
FIG. 2 is a plan view of the system of FIG. 1.

Consider the system 10 to be disposed as illustrated in full lines in FIG. 1, with a load 12 on pallet 14, hitch socket 34 between guide plates 60, and air-check plunger 86a closed into cylinder 86. Now, a ball 36 on a cable 38, suspended from a helicopter is caused to be moved forward in the direction of arrow 110 by maneuvering of the helicopter. Guide bars 66 lead cable 38 into a throat defined between guide pads 72, and thence into a notch 112 (FIG. 2) in hitch socket 34. Further forward movement of the upper extremities of cable 38 will cause ball 36 to be drawn upward into seated engagement in socket 34. Thereafter, foreward and/or upward movement of the cable will cause hitch socket 34 to be lifted from between plates 60, and boom 32 to swing upwardly around its pivotal axis defined by bearings 28.

As boom 32 rises along a path designated by arrow 114, rod 102, cylinder 96 and spring 100 will cause lever 90 to rotate about pivot 92 so as to extend air-check plunger 86a. When plunger 86a reaches its limit of outward travel, rotation of lever 90 is halted. Thereafter, further movement of boom 32 towards its vertical position, causes rod 102 to compress spring 100 into a loaded condition. As boom 32 approaches its vertical position, and as an upward strain is taken on cable 38, the force of spring 40 is overcome and hitch socket 34 is caused to align itself with the axis of boom 32. Pallet 14 and its load 12 are then lifted away from pontoon structure 18.

When it is desired to uncouple pallet 14 from cable 38, the cable is lowered by the helicopter until the pallet is supported by some surface. Continued lowering relieves the strain on cable 38, and spring 100 causes rod 102 to be drawn into cylinder 96, thereby moving boom 32 from its vertical position to an intermediate partially lowered position wherein gravity tends to cause it to continue lowering. At that intermediate position, approximately halfway to its lowered position, plunger 86a begins to move into cylinder 86. However, because of the resistive action of air therein, boom 32 is permitted to continue to lower only at a very slow rate, say on the order of one or more minutes to reach its resting position, even though ball 36 is lowered out of socket 34.

Removal of strain on the cable 38 also permits hitch socket 34 to be moved by spring 40 to a position out of alignment with boom 32, against stop 46. This positions hitch socket 34 in a substantially vertical position when boom 32 is in its intermediate position. Operation of the helicopter to move cable 38 in a direction opposite to arrow 110 will now remove cable 38 from notch 112 of socket 34, completing the uncoupling operation.

In some applications, it is desirable that boom 32 be able to pivot laterally with respect to truss 30 from which it extends, in order to avoid tipping of pallet 14 and/or undue stress on boom 32 if the helicopter veers too much to one side or the other during lifting. Accordingly, a pivotal joint 116 may be included between truss 30 and boom 32, and a pair of diverging guide members 118 provided on cylinder 96 to center the boom during lowering to its resting position.

It will be appreciated, from the foregoing detailed description, that the invention has provided a helicopter cargo lifting system that satisfies the aforementioned objects and advantages, particularly well, especially in regard to permitting coupling and uncoupling from a safe operating altitude, and without need of ground personnel.

Obviously, other embodiments and modifications of the subject invention will readily come to the mind of one skilled in the art having the benefit of the teachings presented in the foregoing description and the drawings. It is, therefore, to be understood that this invention is not to be limited thereto and that said modifications and embodiments are intended to be included within the scope of the appended claims.

What is claimed is:

1. Cargo handling apparatus for effecting coupling to, and uncoupling from, a hoist cable having a first coupling member on the end thereof, said apparatus comprising:
   frame means for supporting said cargo;
   a boom having one end pivotally connected to said frame means for movement about an axis disposed above the center of gravity of said frame means and said cargo, said boom being movable about said axis between a lowered resting position and a raised, substantially vertical position;
   a second coupling member mounted on the other end of said boom, said second coupling member being engageable by said first coupling member and cooperable therewith to effect a lifting connection between said cable and said boom;
   spring means, connected between said boom and said frame, for urging said boom from said vertical position toward an intermediate position wherein gravity urges said boom toward said resting position; and
   check means, connected between said boom and said frame means, for retarding movement of said boom from said intermediate position to said resting position under the influence of gravity, wereby said first coupling member may be lowered from engagement with said second coupling member before said boom moves to its resting position.

2. Cargo handling apparatus as defined in claim 1, and further comprising:
   lever means, pivoted on said frame means, for interconnecting said check means and said spring means.

3. Cargo handling apparatus as defined in claim 1, and wherein said check means comprises:
   a first cylinder;
   a plunger reciprocably movable in first and second directions between first and second limiting positions with respect to said first cylinder; and
   means operative between said plunger and said cylinder for yieldably opposing movement of said plunger in one of said first and second directions.

4. Cargo handling apparatus as defined in claim 1, and wherein said spring means comprises:
   a second cylinder;
   a compression spring disposed within said second cylinder; and
   a pull rod having a portion extending into said second cylinder and through said compression spring, said pull rod being operative to compress said spring when said rod is extended with respect to said second cylinder.

5. Cargo handling apparatus as defined in claim 2, and wherein said check means comprises:
   a first cylinder;
   a plunger reciprocably movable in first and second directions between first and second limiting positions with respect to said first cylinder; and
   means operative between said plunger and said cylinder for yieldably opposing movement of said plunger in one of said first and second directions.

6. Cargo handling apparatus as defined in claim 2, and wherein said spring means comprises:
   a second cylinder;
   a compression spring disposed within said second cylinder; and
   a pull rod having a portion extending into said second cylinder and through said compression spring, said pull rod being operative to compress said spring when said rod is extended with respect to said second cylinder.

7. Cargo handling apparatus as defined in claim 2, and wherein said lever means comprises:
   a bell crank having one arm connected to said spring means and another arm connected to said check means.

8. Cargo handling apparatus as defined in claim 5, and wherein said spring means comprises:
   a second cylinder;
   a compression spring disposed within said second cylinder; and
   a pull rod having a portion extending into said second cylinder and through said compression spring, said pull rod being operative to compress said spring when said rod is extended with respect to said second cylinder.

9. Cargo handling apparatus as defined in claim 8, and wherein:
   said lever means comprises a bell crank having one arm connected to said spring means and another arm connected to said check means, so that movements of said boom between said resting position and said intermediate position are accompanied by movements of said plunger with respect to said first cylinder, and movements of said boom between said intermediate position and said vertical position are accompanied by movements of said pull rod with respect to said second cylinder.

10. Cargo handling apparatus, as defined in claim 9, wherein:
    said second coupling member comprises a socket member pivotally connected to the end of said boom for movement into and out of axial alignment with said boom; and said apparatus further comprises second spring means for urging said socket member toward a predetermined position with respect to said boom.

11. Cargo handling apparatus as defined in claim 10, and further comprising:
   platform means for supporting said frame means; and
   boom crutch means, mounted on said platform means, for holding said boom and said second coupling member steady when said boom is in said resting position.

12. Cargo handling apparatus as defined in claim 11, and further comprising:
   guide means, mounted on said platform means, for leading said cable and said first coupling member into engagement with said second coupling member.

13. Cargo handling apparatus as defined in claim 12, and wherein said guide means comprises:
   a pair of parallel, laterally spaced, vertically extending guide plates, connected to said boom crutch means; and
   a pair of converging, substantially horizontally extending guide bars, having their closer ends connected to respective ones of said guide plates.

14. Cargo handling apparatus as defined in claim 13, and wherein:
   said platform means comprises a pair of laterally spaced, parallel pontoons for effecting flotation of said apparatus on a body of water.

15. Cargo handling apparatus for effecting coupling to, and uncoupling from, a helicopter hoist cable having a coupling ball on the end thereof, said apparatus comprising:
   a cargo supporting frame including a pallet portion, a pair of uprights extending from opposite sides of said pallet portion and having bearing means at the upper ends thereof, a transverse truss pivotally connected by said bearing means for movement about a horizontal axis above the center of gravity of said frame and said cargo;
   a boom having one end pivotally connected to said truss so that said boom is swingable laterally with respect to said truss and also is swingable with said truss about said horizontal axis between a substantially vertical position and a lowered, resting position;
   a coupling socket connected to the other end of said boom and engageable by said coupling ball;
   a horizontal support platform for supporting said cargo supporting frame;
   a boom gallows, mounted on said horizontal support platform, and comprising means for supporting said coupling socket in a predetermined position;
   a pair of converging guide bars, mounted on said horizontal support platform, for leading said cable and coupling ball into said socket;
   a stanchion extending upwardly from said pallet;
   a bell crank lever pivoted to the upper end of said stanchion for movement in a vertical plane common with said boom when the latter is in said gallows;
   dash pot means connected between said bell crank lever and said pallet for yieldably resisting movement of said bell crank lever in one direction and for positively limiting movement of said bell crank lever in the opposite direction;
   lost motion connecting means, connected between said boom and said bell crank lever for effecting a solid link of predetermined length between said boom and said bell crank when said boom is moving between a predetermined intermediate position and said lowered position, said lost motion connecting means serving to form a loose link between said boom and said bell crank lever when said boom is moving between said intermediate position and said vertical position; and
   spring means, connected between said boom and said bell crank lever, for resiliently urging said boom from said vertical position to said intermediate position.

* * * * *